(12) United States Patent  (10) Patent No.: US 6,601,376 B2
Stones  (45) Date of Patent: Aug. 5, 2003

(54) CYLINDER BLADE FOR A MOWER

(75) Inventor: Kevin Stones, County Durham (GB)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 10/158,098

(22) Filed: May 30, 2002

(65) Prior Publication Data

US 2003/0014956 A1 Jan. 23, 2003

(30) Foreign Application Priority Data

May 30, 2001 (GB) .............................. 0112967

(51) Int. Cl.⁷ .............................. A01D 34/53
(52) U.S. Cl. .......................... 56/294; 56/249
(58) Field of Search .................. 56/249, 255, 294, 56/295, 250, 251, 252, 253, 254, DIG. 20

(56) References Cited

U.S. PATENT DOCUMENTS 1,818,220 A 8/1931 Gratiot
2,528,116 A 10/1950 Clemson
6,131,377 A 10/2000 Rice et al.

FOREIGN PATENT DOCUMENTS

| EP | 0071424 A1 | 9/1983 |
| GB | 2116413 A | 9/1983 |
| GB | 2136664 A | 9/1984 |
| GB | 2157548 A | 10/1985 |

Primary Examiner—Robert E. Pezzuto
(74) Attorney, Agent, or Firm—Paul L. Ratcliffe

(57) ABSTRACT

A cylinder cutting blade for a lawn mower that includes at least two modular cylinder cutting blade sections. Each modular cylinder cutting blade section effectively being a short cylinder cutting blade which are rotationally connected together in succession in such a manner that rotation of one modular cylinder cutting blade section results in rotation of the other modular cylinder cutting blade sections. Each modular cylinder cutting blade section includes a longitudinal axis, a plurality of cutting bars which spiral around the longitudinal axis, a frame to hold the cutting bars in their respective positions, and a locking mechanism. The locking mechanism of each modular cylinder cutting blade section interacts with the locking mechanism of adjacent modular cylinder cutting blade sections to rotatably lock the modular cylinder cutting blade section to the adjacent modular cylinder cutting blade sections.

25 Claims, 5 Drawing Sheets

CYLINDER BLADE FOR A MOWER

FIELD OF INVENTION

The present invention relates to lawn mowers and in particular to cylinder cutting blades for lawn mowers.

BACKGROUND OF THE INVENTION

The use of cylinder cutting blades is well known in the art of lawn mowers. Cylinder cutting blades comprise a plurality of cutting bars mounted on a frame which spiral around, in a helical fashion, the longitudinal axis of the cylinder cutting blade. The radial distance of the outer edge of the cutting bars from the longitudinal axis remains constant along the length of the cutting bars.

The cylinder cutting blade is mounted in the front of a lawn mower and rotated by a motor about its longitudinal axis. A stationary shear blade is located in close proximity to the path swept out by the outer edge of the rotating cutting bars so that any vegetation such as grass is sheared by the action of the rotating cutting bars shearing the vegetation against the shear blade. The helical design of the cutting bars ensure that a smooth shearing action takes place.

Traditional designs of cylinder cutting blade have metal cutting bars which are welded onto a metal frame. This results in a structure which is complicated and expensive to make.

GB 2,116,413 discloses a cylinder cutting blade which comprises a blade holder upon which are mounted disposable plastic blades. Such a construction, however, is complicated.

BRIEF SUMMARY OF THE INVENTION

According to the first aspect of the present invention, there is provided a cylinder cutting blade for a lawn mower characterized in that it comprises at least two modular cylinder cutting blade sections which are rotationally connected together in succession in such a manner that rotation of one modular cylinder cutting blade section results in rotation of the other modular cylinder cutting blade section.

By manufacturing, the cylinder cutting blade in this manner, it provides a simple and cheap construction. Furthermore, it allows cutting cylinders of different lengths to be manufactured from one design of modular cylinder cutting blade section. The length of the blade is increased by increasing the number of modular cylinder cutting blade sections used.

It will be appreciated by a person skilled in the art that this invention can be utilized with any design of cylinder blade for a lawn mower. Each modular cylinder cutting blade section is effectively a short cylinder cutting blade which can be connected in series to an adjacent one to make a longer cutting blade.

The cylinder cutting blade can be constructed from at least two modular cylinder cutting blade sections, each modular cylinder cutting blade section having a longitudinal axis and a locking mechanism wherein the modular cylinder cutting blade sections are mounted in succession so that their axes are substantially co-axial and the locking mechanism of each modular cylinder cutting blade section interacts with the locking mechanism of adjacent modular cylinder cutting blade sections to rotationally lock that modular cylinder cutting blade section to the adjacent modular cylinder cutting blade sections so that rotation of one modular cylinder cutting blade section results in rotation of the adjacent modular cylinder cutting blade sections.

The cylinder cutting blade preferably comprises a longitudinal axis, a plurality of cutting bars which spiral around the longitudinal axis, and a frame to hold the cutting bars in their respective positions characterized in that the cylinder cutting blade is constructed from at least two modular cylinder cutting blade sections. Each modular cylinder cutting blade section comprises a longitudinal axis, a plurality of cutting bars which spiral around the longitudinal axis, a frame to hold the cutting bars in their respective positions, and a locking mechanism. The modular cylinder cutting blade sections are mounted in succession so that their axes are substantially co-axial. The locking mechanism of each modular cylinder cutting blade section interacts with the locking mechanism of adjacent modular cylinder cutting blade sections to rotatably lock the modular cylinder cutting blade section to the adjacent modular cylinder cutting blade sections. Therefore the rotation of the modular cylinder cutting blade section results in rotation of adjacent modular cylinder cutting blade sections.

According to the second aspect of the present invention, there is provided a lawn mower having a cylinder cutting blade characterized in that it comprises at least two modular cylinder cutting blade sections which are rotationally connected together in succession in such a manner that rotation of one modular cylinder cutting blade section results in rotation of the other modular cylinder cutting blade section to form the cylinder cutting blade.

According to the third aspect of the present invention, there is provided a modular cylinder cutting blade section characterized in that it is capable of connecting to at least one other modular cylinder cutting blade section in succession to form a longitudinal cylinder cutting blade so that rotation of the modular cylinder cutting blade section results in rotation of the other modular cylinder cutting blade section.

BRIEF DESCRIPTION OF THE DRAWINGS

The invention will now be described with reference to the accompanying drawings, of which.

DETAILED DESCRIPTION OF THE INVENTION

Figure 1:
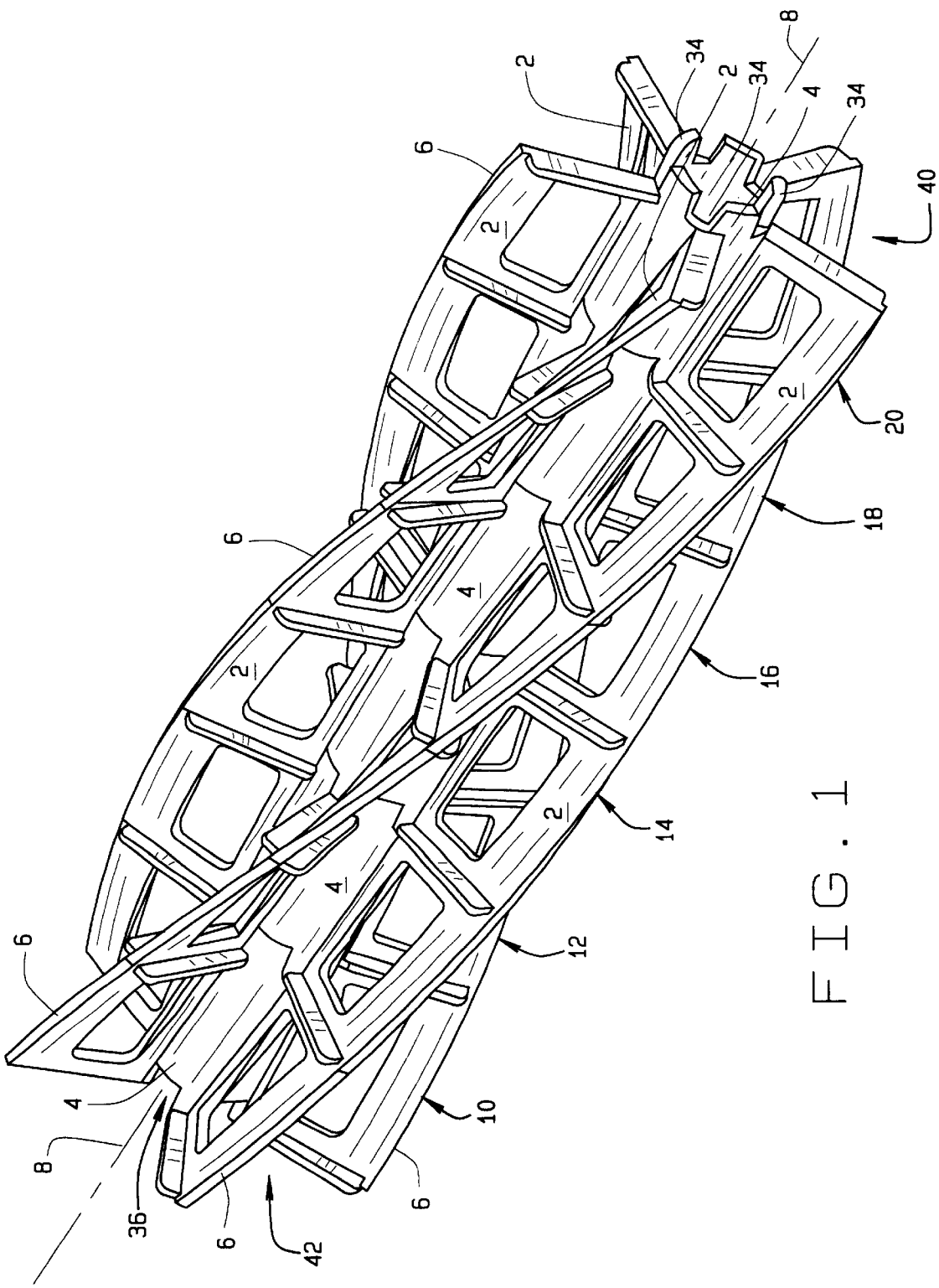
FIG. 1 shows a perspective view of a cylinder cutting blade.
Figure 2:
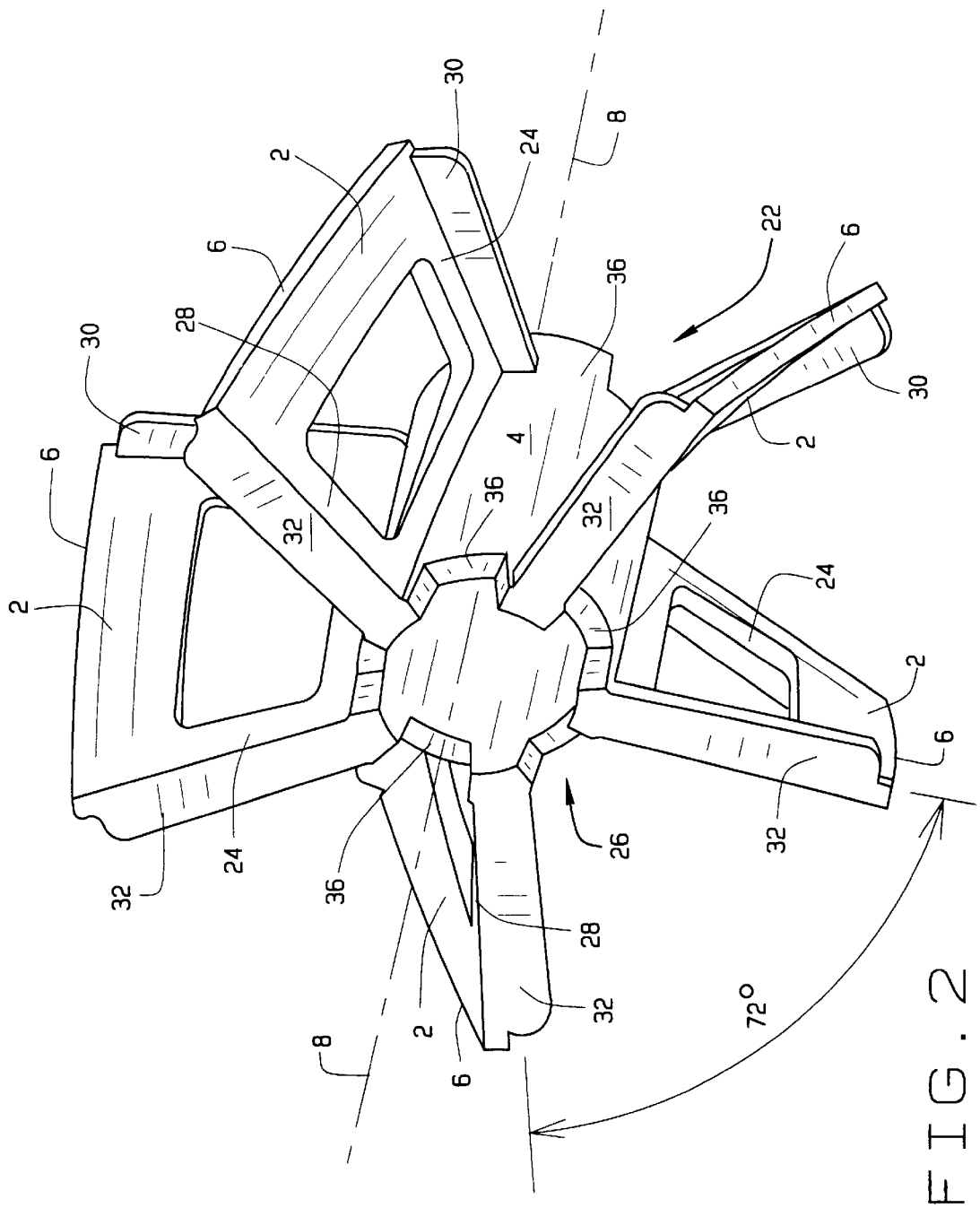
FIG. 2 shows a perspective view of a first end of a modular cylinder cutting blade section of the cylinder cutting blade.
Figure 3:
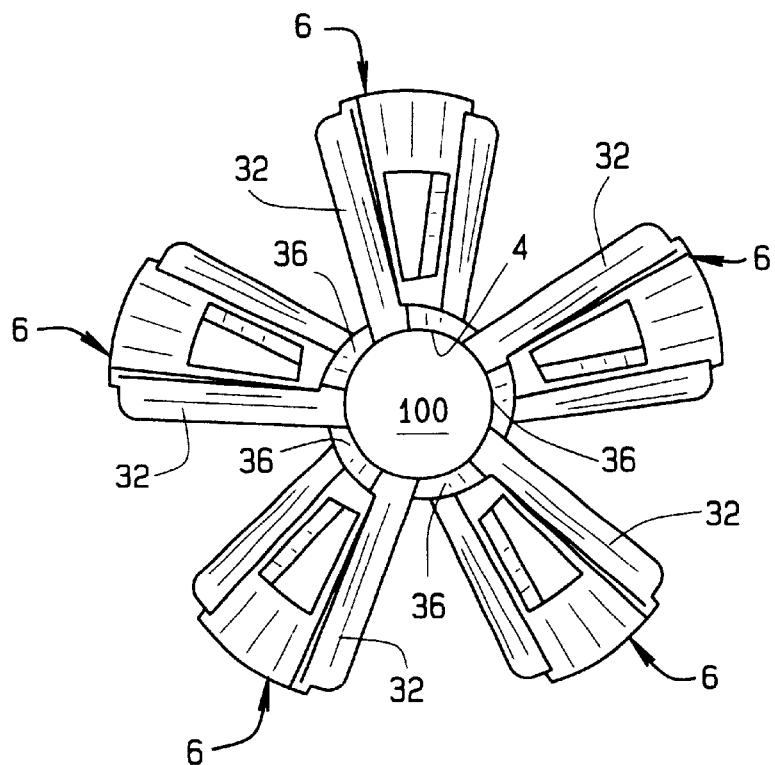
FIG. 3 shows a first end of the modular cylinder cutting blade section of the cylinder cutting blade.
Figure 4:
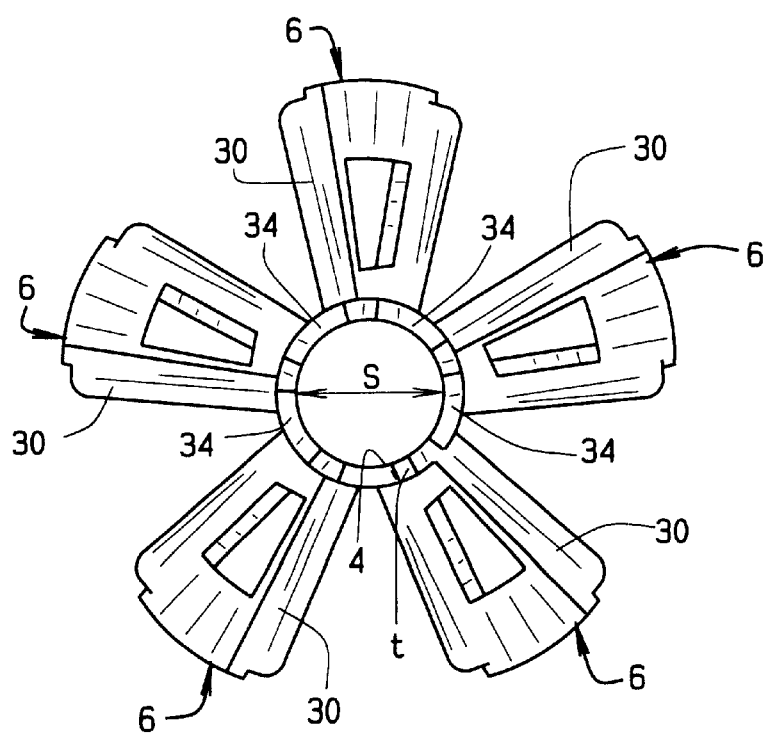
FIG. 4 shows a second end of the modular cylinder cutting blade section of the cylinder.

FIG. 1 shows an example of a fully assembled cylinder cutting blade according to the present invention. The cylinder cutting blade comprises five cutting bars (generally indicated as 2 in FIG. 1) which spiral around a central tubular core (4). The rate at which and the direction in which the cutting bars (2) spiral around the central tubular core (4) is constant. The outer edges (6) of the cutting bars (2) are located at a constant radial distance from a longitudinal axis (8) of the central tubular core (4), the longitudinal axis (8) of the central tubular core (4) also being the longitudinal axis of the cylinder cutting blade.

The cylinder cutting blade is constructed from six modular cylinder cutting blade sections (10; 12; 14; 16; 18; 20) (as shown in FIG. 1) which are mounted together in succession on a steel tube (not shown) which passes through the tubular core (4) of each of the modular cylinder cutting blade sections (10; 12; 14; 16; 18; 20) to form the cylinder cutting blade. Each modular cylinder cutting blade section (10; 12; 14; 16; 18; 20) is effectively a short cylinder cutting blade which, when mounted in succession on the steel tubes, form the longer cylinder cutting blade.

Each of the six modular cylinder cutting blade sections (10; 12; 14; 16; 18; 20) are identical in shape to the other five modular cylinder cutting blade sections (10; 12; 14; 16; 18; 20).

A modular cylinder cutting blade section (10; 12; 14; 16; 18; 20) shall now be described with reference to FIGS. 2 to 6. Each modular cylinder cutting blade section (10; 12; 14; 16; 18; 20) comprises a central tubular core (4) having a longitudinal axis (8), the longitudinal axis (8) of the central tubular core (4) also being the longitudinal axis of the modular cylinder cutting blade section (10; 12; 14; 16; 18; 20).

Extending radially outwards from a first end (22) (shown facing in FIG. 4) of the central tubular core (4) are five support arms (24). Extending radially outwards from a second end (26) (shown facing in FIG. 3) of the central tubular core (4) are five more support arms (28). The five support arms (24) located around the first end (22) are angularly spaced around the longitudinal axis (8) by equal amounts so that there is an angle of 72° between adjacent support arms (24). Similarly, the five support arms (28) located around the second end (26) are angularly spaced around the longitudinal axis (8) by equal amounts so that there is an angle of 72° between adjacent support arms (28). However, the angular positions of the support arms (28) which extend from the second end (26) are twisted by 36° around the longitudinal axis (5) in relation to the support arms (24) which extend from the first end (22) so that they lie angularly midway between the support arms (24) extending from the first end (22).

Attached to ends of the support arms (24; 28) are the cutting bars (2). Each cutting bar (2) extends perpendicularly from the end of a support arm (24) which extends from the first end (22) to the end of a support arm (28) which extends the second end (26). The cutting bars (2) are curved and spiral around the longitudinal axis (8) of the central tubular core (4) at uniform rate through 36° in a helical manner. The outer edges (6) of the cutting bars (2) are radially equidistant from the longitudinal axis (8).

A flange (30) extends sideways from each of the front of the support arms (24) extending from the first end (22) in a direction tangential to the longitudinal axis (8). Similarly, a flange (32) extends sideways from each of the rear of the support arms (28) extending from the second end (26) in a direction tangential to the longitudinal axis (8) but in the opposite direction around the longitudinal axis (8) to that of the flanges (30) on the front support arms (24).

Formed at the first end (22) of the central tubular core (4) are rectangular castellations (34) which project from the first end (22) in a direction perpendicular to that of the longitudinal axis (8).

Formed in the second end (26) of the central tubular core (4) are rectangular recesses (36). The dimensions of the rectangular recesses correspond to those of the castellations (34) so that the castellations (34) of one modular cutting cylinder section (10; 12; 14; 16; 18; 20) are able to slot into the recess of another modular cutting 5 cylinder section to form a tight fit.

Each modular cylinder cutting blade section is formed from glass filled polyamide (glass filled nylon) in a one piece construction.

Each modular cutting blade section (10; 12; 14; 16; 18; 20) is molded using a two piece mold. In order for a two piece mold to be used, the length D has to be less than a predetermined amount due to the curvature of the spiraling cutting bars (2).

Figure 5:
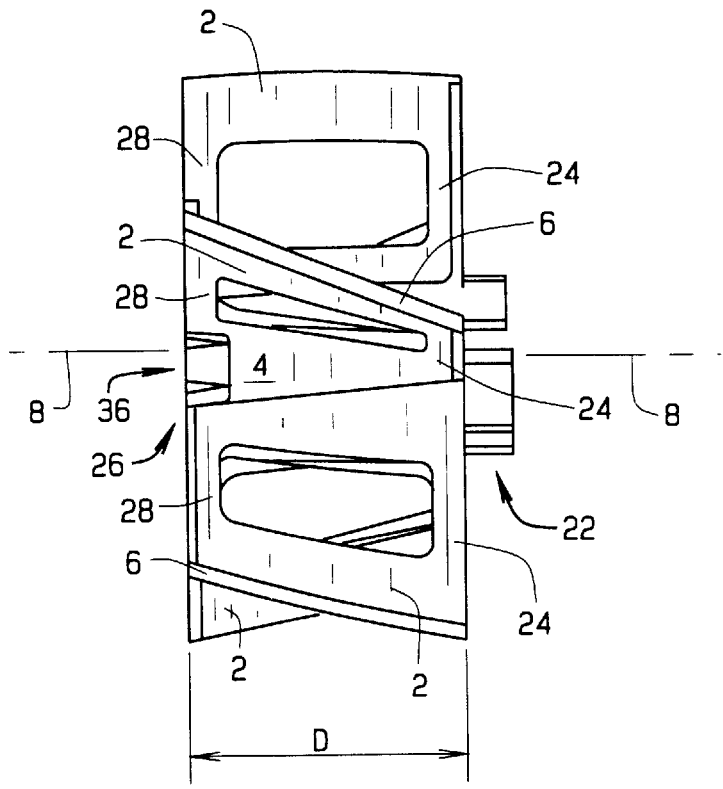
FIG. 5 shows a side view of the modular cylinder cutting blade section.
Figure 6:
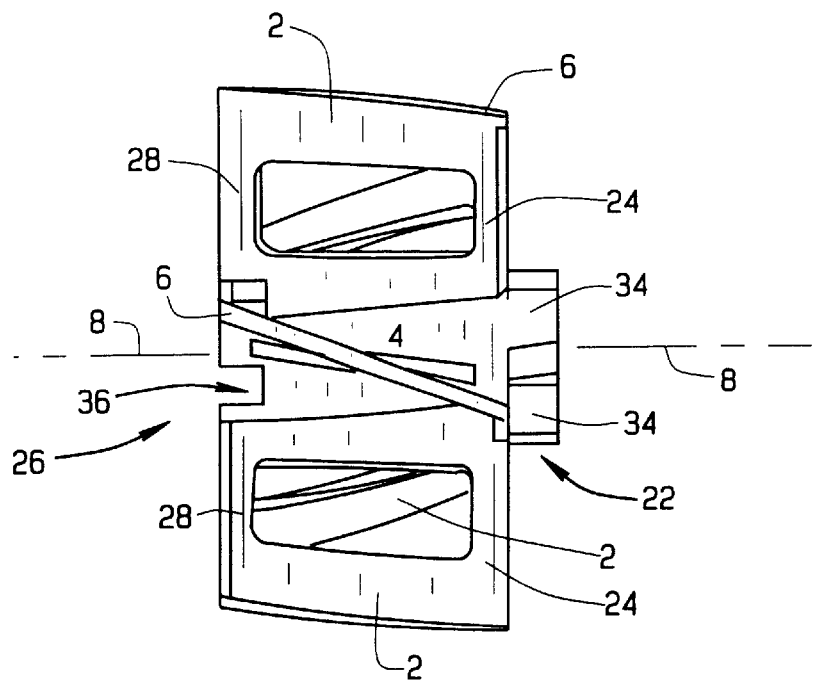
FIG. 6 shows a second side view of the modular cylinder cutting blade section with the modular section rotated about its longitudinal axis relative to FIG. 5.
Figure 7:
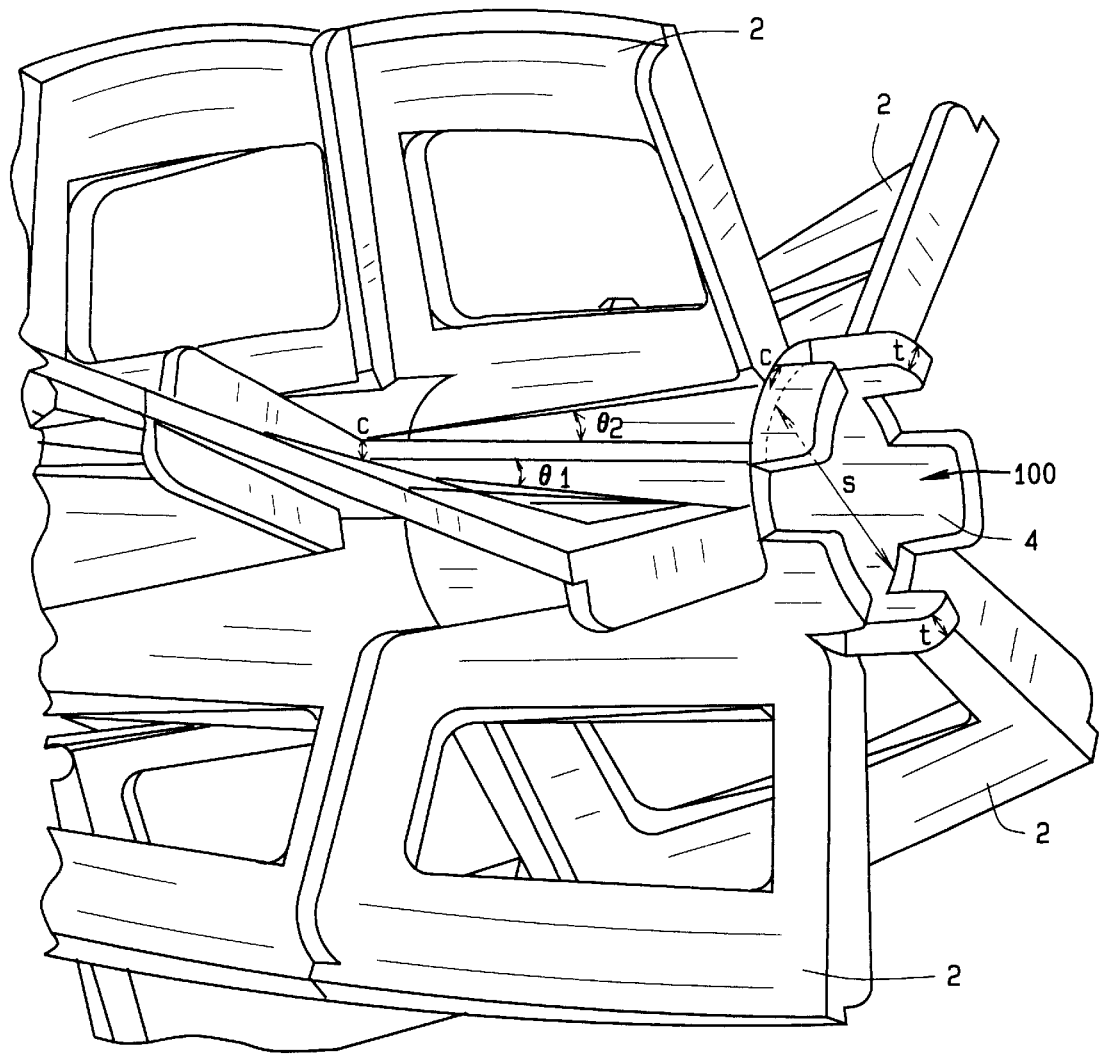
FIG. 7 shows a perspective view of one end of the cylinder blade.

The maximum length D (as best seen in FIG. 5) is $$\frac{\pi(S+2t)-2nc}{n(\tan\theta_1+\tan\theta_2)}$$

where
S is the diameter of the internal bore 100 of the tubular core (4);
c is the size of the tooling land (see FIG. 7);
t is the thickness of the tubular core (4);
$\theta_1$ is the helix angle at the outer diameter of the tubular core (4);
$\theta_2$ is the shut off angle; and
n is the number of cutting bars.

In this particular embodiment, S=25, t=2.5, 02=4.15, 01=6.8, c=4.5, and n=5.

The cylinder cutting blade is assembled as follows.

A first modular cylinder cutting blade section (10) is mounted onto a steel tube (not shown) by passing the steel tube through its central tubular core (4). The diameter of the steel tube is slightly less than that of the diameter of the bore (38) the central tubular core (4) so that it is able to pass through the central tubular core (4) and allow the modular cylinder cutting blade section (10) to rotate freely around the steel tube whilst providing a tight fit. A second modular cylinder cutting blade section (12) is mounted onto the steel tube in succession to the first modular cylinder cutting blade section (10) so that it is adjacent to the first modular cylinder cutting blade section (10). The castellations (34) of the first modular cylinder cutting blade section (10) slot into and engage with the recesses (36) of the second modular cylinder cutting blade section (12) as shown in FIG. 1. Because the castellations (34) of the first modular cylinder cutting blade section (10) engage with the recesses (36) of the second cutting blade section (12), any rotational movement of the first modular cylinder cutting section (10) around the steel tube causes the second modular cylinder cutting blade section (12) to rotates and vice versa.

When the two modular cylinder cutting blade sections (10; 12) are mounted on the steel tube intermeshed, the cutting bars (2) of the two modular cutting blade sections (10; 12) are aligned to produce one extended cutting bar (2) which spirals for the length of the two sections (10; 12) through 72° as shown in FIG. 1.

The other four modular cylinder cutting blade sections (14; 16; 18; 20) are similarly mounted on the steel tube so that adjacent castellations (34) on one modular cylinder cutting blade section meshes within the recesses (36) of the adjacent modular cylinder cutting blade section as shown in FIG. 1. Rotation of any one of the modular cylinder cutting blade sections (10; 12; 14; 16; 18; 20) results in rotation of them all. The cutting blades (2) of adjacent sections are aligned as shown in FIG. 1.

The cylinder blade is rotated in the mower by the free castellations on the end 30 modular cylinder cutting section (20) at one end (40) engaging with a rotational drive mechanism (not shown) on the mower and the empty recesses (36) at the other end (42) of the cylinder blade engaging with a second rotational drive mechanism. Rotation of the drive mechanisms in unison rotates the end modular cylinder blade cutting sections (10; 20) and hence all the other modular cylinder cutting blade sections (12; 14; 16; 18).

What is claimed is:

1. A cylinder cutting blade for a mower wherein the cylinder cutting blade comprises:
    a longitudinal axis; and
    at least two modular cylinder cutting blade sections, each said modular cylinder cutting blade section comprising:
        opposing ends;
        a plurality of cutting bars which spiral around the longitudinal axis;
        a frame to hold the cutting bars in their respective positions; and
        a locking mechanism;
        wherein the modular cylinder cutting blade sections are mounted in succession so that their axes are substantially co-axial and the locking mechanism of each said modular cylinder cutting blade section interacts with the locking mechanism of it's adjacent said modular cylinder cutting blade section to so that rotation of one of the modular cylinder cutting blade sections results in rotation of the other modular cylinder cutting blade section.

2. A cylinder cutting blade as claimed in claim 1, wherein the cutting bars of one of said modular cutting blade sections are adapted to align with the cutting bars of the other modular cylinder cutting blade section.

3. A cylinder cutting blade as claimed in claim 1, wherein the locking mechanism of each said modular cylinder cutting blade section comprises a first part mounted on one end of each said modular cylinder cutting blade section and a second part mounted on the other end of each said modular cylinder cutting blade section, the first part of the locking mechanism on one of said modular cylinder cutting blade sections interacting with the second part of the locking mechanism on the other modular cylinder cutting blade section.

4. A cylinder cutting blade as claimed in claim 3, wherein the first part of the locking mechanism on each said modular cylinder cutting blade section comprises castellations.

5. A cylinder cutting blade as claimed in claim 3, wherein the second part of the locking mechanism on each said modular cylinder cutting blade section comprises recesses.

6. A cylinder cutting blade as claimed in claim 1, wherein the frame of each modular cylinder cutting blade section comprises a tube, which runs the length of the modular cylinder cutting blade section, the longitudinal axis of the tube being coextensive with the longitudinal axis of the modular cylinder cutting blade section.

7. A cylinder cutting blade as claimed in claim 6, wherein the modular cylinder cutting blade sections are mounted in succession on a rod which passes through the tube of each said modular cylinder cutting blade section.

8. A cylinder cutting blade as claimed in claim 1, wherein each said modular cylinder cutting blade section is manufactured from glass filled polyamide.

9. A cylinder cutting blade as claimed in claim 1, wherein each said modular cylinder cutting blade section is manufactured in a one piece construction.

10. A cylinder cutting blade as claimed in claim 1, wherein a length D of each of the modular cylinder cutting blade sections is not greater than;

$$\frac{\pi(S+2t) - 2nc}{n(\tan\theta_1 + \tan\theta_2)}$$

where
    S is an internal diameter of a tube which runs a length of the modular cylinder cutting blade section;
    t is a thickness of the tube;
    n is a number of cutting bars;
    c is a tooling land;
    $\theta_2$ is a shut off angle; and
    $\theta_1$ is a helix angle at an outer diameter of the tube.

11. A lawn mower comprising:
    a motor; and
    a cylinder cutting blade engageable by the motor, wherein the cylinder cutting blade comprises at least two modular cylinder cutting blade sections, each modular cylinder cutting blade section comprising:
        a longitudinal axis;
        a plurality of cutting bars which spiral around the longitudinal axis;
        a frame to hold the cutting bars in their respective positions; and
        a locking mechanism;
        wherein the modular cylinder cutting blade sections are mounted in succession so that their axes are substantially co-axial and the locking mechanism of each said modular cylinder cutting blade section interacts with the locking mechanism of it's adjacent said modular cylinder cutting blade section so that rotation of one of the modular cylinder cutting blade sections results in rotation of the other modular cylinder cutting blade section.

12. A lawn mower as claimed in claim 11, wherein the cylinder cutting blade is rotatingly driven by the motor via at least one part of the locking mechanism of the modular cylinder cutting blade section located at an end of a row of successive modular cylinder cutting blade sections.

13. A lawn mower as claimed in claim 11, wherein the cylinder cutting blade is rotatingly driven by the motor via at least one part of the locking mechanism of the modular cylinder cutting blade sections located at opposing ends of a row of successive modular cylinder cutting blade sections.

14. A modular cutting blade apparatus comprising:
    a first modular cylinder cutting blade section having:
        opposing ends;
        a longitudinal axis;
        a plurality of cutting bars which spiral around the longitudinal axis; and
        a frame which locates the cutting bars in their respective positions;
        wherein the frame of the first modular cylinder cutting blade section comprises a locking mechanism adapted to interact with a locking mechanism of a second modular cylinder cutting blade section so that, when the second modular cylinder cutting blade section is mounted adjacent to the first modular cylinder cutting blade section with the longitudinal axes substantially co-axial, the locking mechanism of the first modular cylinder cutting blade section interacts with the locking mechanism of the second modular cylinder cutting blade section to rotatably lock the first modular cylinder cutting blade section to the second modular cylinder cutting blade section so that rotation of the first modular cylinder cutting blade section results in the rotation of the second modular cylinder cutting blade section.

15. The apparatus as claimed in claim 14, wherein the cutting bars the first modular cylinder cutting blade section are adapted to align with the cutting bars of the second modular cylinder cutting blade section.

16. The apparatus as claimed in claim 14, wherein the locking mechanism of the first modular cutting blade section comprises a first part mounted on one end of the first modular cylinder cutting blade section and a second part mounted on the other end of the first modular cylinder cutting blade section, the first part of the locking mechanism on the first modular cylinder cutting blade section is adapted to interact with a second part of the locking mechanism on the second modular cylinder cutting blade section.

17. The apparatus as claimed in claim 14, wherein the frame further comprises a tube, having opposing ends, which runs the length of the first modular cylinder cutting blade section, the longitudinal axis of the tube being coextensive with the longitudinal axis of the first modular cylinder cutting blade section.

18. The apparatus as claimed in claim 17, wherein the frame further comprises a plurality of arms which project from the ends of the tube substantially perpendicular to the longitudinal axis of the tube, wherein the cutting bars are rigidly mounted on distal ends of the arms.

19. The apparatus as claimed in claim 17, wherein the first modular cylinder cutting blade section is mounted on a rod which passes through the tube of the first modular cylinder cutting blade section.

20. The apparatus as claimed in claim 17, wherein the locking mechanisms of the first cylinder cutting blade section comprises castellations formed around the entrance of one end of the tube.

21. The apparatus as claimed in claim 20, wherein the locking mechanism of the first cylinder cutting blade section further comprises recesses formed around the other end of the tube.

22. The apparatus as claimed in claim 14, wherein the first modular cylinder cutting blade section is manufactured from glass filled polyamide.

23. The apparatus as claimed in claim 14, wherein the first modular cylinder cutting blade section is manufactured in a one piece construction.

24. The apparatus as claimed in claim 14, wherein an outer edge of each said cutting bar is of constant radial distance from the longitudinal axis.

25. The apparatus as claimed in claim 14, wherein the first modular cylinder cutting blade section has a length D no greater than;

$$\frac{\pi(S+2t)-2nc}{n(\tan\theta_1+\tan\theta_2)}$$

where
- S is an internal diameter of a tube which runs a length of the modular cylinder cutting blade section;
- t is a thickness of the tube;
- n is a number of cutting bars;
- c is a tooling land;
- $\theta_2$ is a shut off angle; and
- $\theta_1$ is a helix angle at an outer diameter of the tube.

* * * * *